United States Patent
Lee

(10) Patent No.: US 9,664,519 B2
(45) Date of Patent: May 30, 2017

(54) POSITIONING SYSTEM AND METHOD THEREOF FOR AN OBJECT AT HOME

(71) Applicant: Wen-Sung Lee, Taichung (TW)

(72) Inventor: Wen-Sung Lee, Taichung (TW)

(*) Notice: Subject to any disclaimer, the term of this patent is extended or adjusted under 35 U.S.C. 154(b) by 854 days.

(21) Appl. No.: 13/945,863

(22) Filed: Jul. 18, 2013

(65) Prior Publication Data

US 2015/0025839 A1   Jan. 22, 2015

(51) Int. Cl.
| | | |
|---|---|---|
| *G01B 21/16* | (2006.01) | |
| *G01C 21/20* | (2006.01) | |
| *G01C 21/00* | (2006.01) | |
| *G01S 5/00* | (2006.01) | |
| *G01S 5/16* | (2006.01) | |
| *G01S 11/12* | (2006.01) | |

(52) U.S. Cl.
CPC ............ *G01C 21/206* (2013.01); *G01B 21/16* (2013.01); *G01C 21/00* (2013.01); *G01S 5/00* (2013.01); *G01S 5/16* (2013.01); *G01S 11/12* (2013.01)

(58) Field of Classification Search
USPC ........................................................ 702/150
See application file for complete search history.

(56) References Cited

U.S. PATENT DOCUMENTS

| | | | | |
|---|---|---|---|---|
| 2003/0176986 A1* | 9/2003 | Dietsch | ............... | G01C 15/002 702/150 |
| 2004/0148125 A1* | 7/2004 | Fager | ................. | G01S 5/163 702/150 |
| 2009/0242769 A1* | 10/2009 | Luterotti | ............... | G01J 5/0022 250/339.02 |
| 2013/0176337 A1* | 7/2013 | Lu | ......................... | G06T 19/006 345/633 |
| 2013/0214166 A1* | 8/2013 | Barlow | ................... | G01S 5/16 250/342 |
| 2013/0328712 A1* | 12/2013 | Zhevelev | ................ | G01S 13/50 342/28 |

* cited by examiner

*Primary Examiner* — Paul D Lee
(74) *Attorney, Agent, or Firm* — Rosenberg, Klein & Lee

(57) ABSTRACT

A positioning system adapted to be assembled in an enclosed space, includes a positioning device having a directional arithmetic unit and a positional arithmetic unit; and a plurality of sensors, each sensor electrically connected to the directional arithmetic unit and the positional arithmetic unit of the positioning device. Under this arrangement, the directional arithmetic unit and the positional arithmetic unit of the positioning device accurately measures a current position of an object in the enclosed space, via a time difference between the sensors and an output value of a voltage of each sensor.

3 Claims, 4 Drawing Sheets

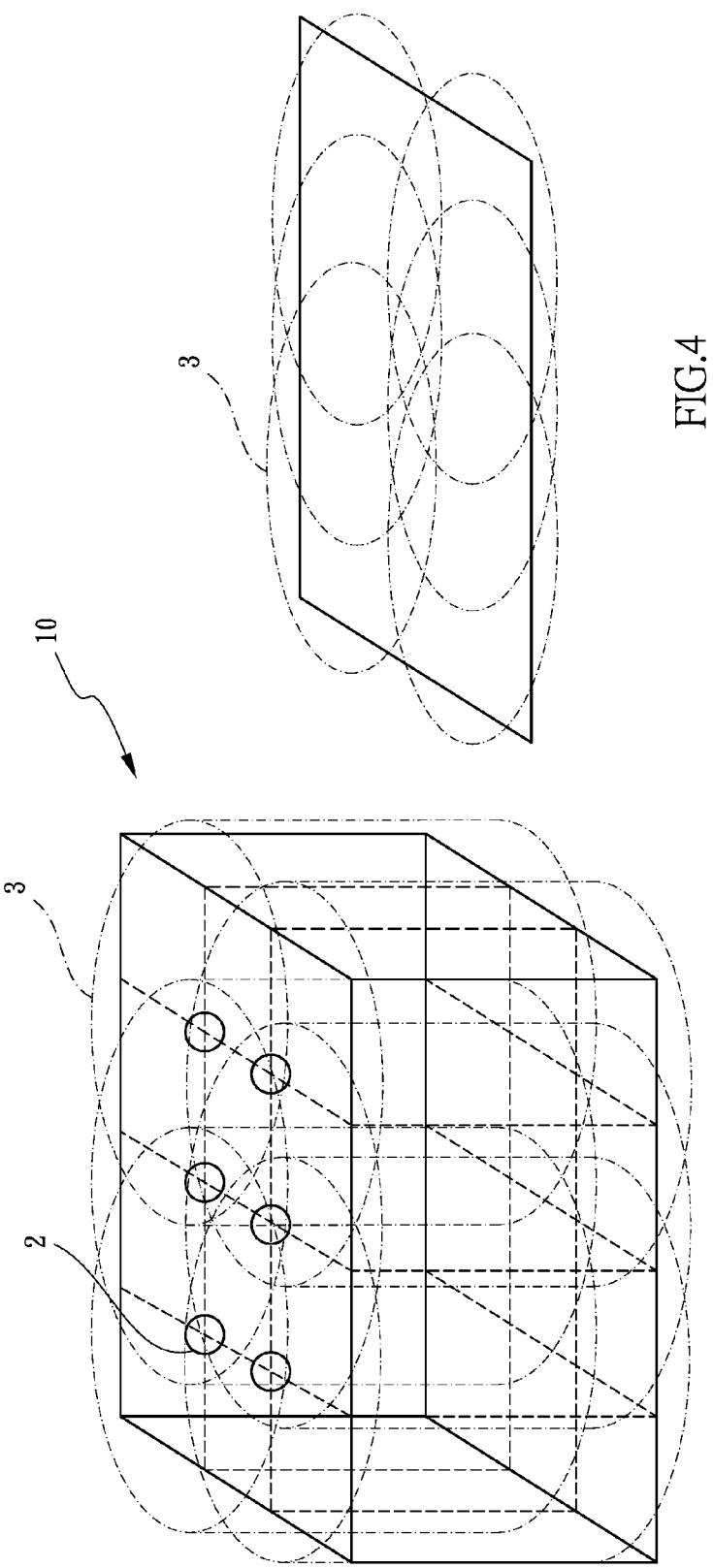

POSITIONING SYSTEM AND METHOD THEREOF FOR AN OBJECT AT HOME

BACKGROUND OF THE INVENTION

1. Field of the Invention

The present invention relates to a positioning system and a method thereof, and more particularly to a positioning system and a method thereof for an object at home.

2. Description of Related Art

A conventional positioning system includes a ground pad, a central control unit and a self power generating unit. The ground pad is configured to detect a moving target and output an electrical control signal. The central processing unit is configured to transport a control command based on the electrical control signal. The self power generating unit is configured to transform the kinetic energy of the moving target to the electricity and provide power to the ground pad and the central control unit. Based on the location distribution of the moving target, the invention can make a functional range of an electronic device cover the moving target through the control command set forth above. Therefore, the invention can generate power through the kinetic energy and intelligently control the electronic device.

However, if the moving target is not on the ground pad, the ground pad cannot detect the moving target; in other words, the conventional positioning system is not functional.

The present invention has arisen to mitigate and/or obviate the disadvantages of the conventional.

SUMMARY OF THE INVENTION

The main objective of the present invention is to provide an improved positioning system.

To achieve the objective, a positioning system adapted to be assembled in an enclosed space, comprises a positioning device having a directional arithmetic unit and a positional arithmetic unit; and a plurality of sensors, each sensor electrically connected to the directional arithmetic unit and the positional arithmetic unit of the positioning device. Under this arrangement, the directional arithmetic unit and the positional arithmetic unit of the positioning device accurately measures a current position of an object in the enclosed space, via a time difference between the sensors and an output value of a voltage of each sensor.

A method of the positioning system comprises directional searching step: the directional arithmetic unit calculates an angle between the object and each sensor via a distance parameter between each two adjacent sensors and a speed parameter of the object; and positional searching step: the positional arithmetic unit measures a position of the object relative to at least three sensors, via an output ADC voltage from three adjacent sensors. Wherein, the object is a heat source or an IR. Under this arrangement, said steps accurately measure a current position of an object in an enclosed space.

Further benefits and advantages of the present invention will become apparent after a careful reading of the detailed description with appropriate reference to the accompanying drawings.

BRIEF DESCRIPTION OF THE DRAWINGS

FIGS. 3-4 are diagrams for showing a detecting region of the present invention;

DETAILED DESCRIPTION OF THE INVENTION

Figure 2:
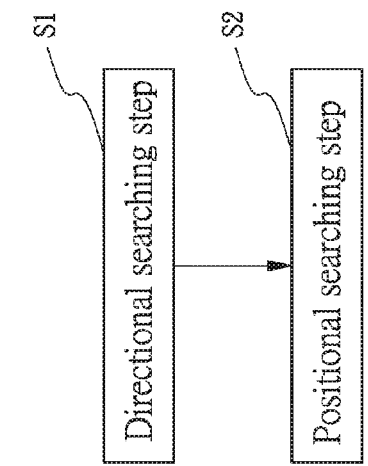
FIG. 2 is a block chart for a method of the positioning system.
Figure 1:
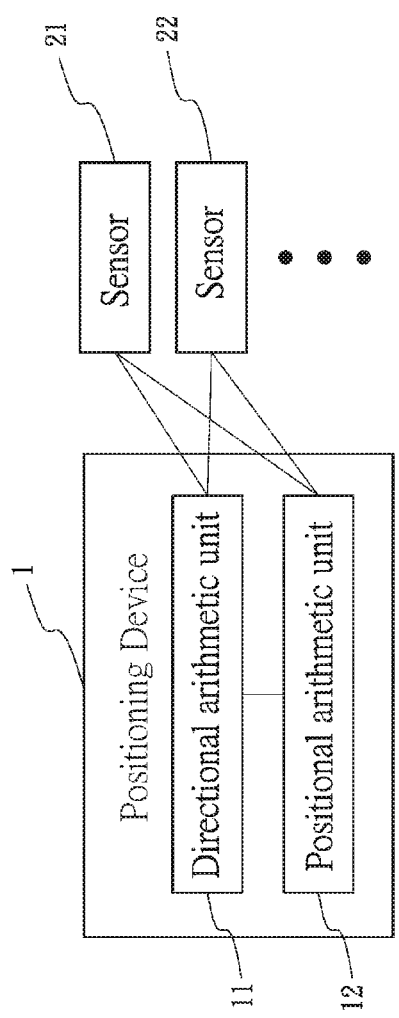
FIG. 1 is a block chart for a positioning system of the present invention.

Referring to FIGS. 1-5, a positioning system for an object at home in accordance with the present invention comprises a positioning device 1 and a plurality of sensors 21, 22, 23, 24 and 25. The positioning device 1 has a directional arithmetic unit 11 and a positional arithmetic unit 12. Each sensor 21, 22, 23, 24 or 25 is a PIR (Passive Infrared) sensor. Each sensor 21, 22, 23, 24 or 25 is electrically connected to the directional arithmetic unit 11 and the positional arithmetic unit 12 of the positioning device 1. Specially, the directional arithmetic unit 11 and the positional arithmetic unit 12 of the positioning device 1 may accurately measure a current position of a movable object in an enclosed space 10, via a time difference between the sensors 21, 22, 23, 24 and 25 closest to the movable object while the movable object passes therethrough in series and an output value of a voltage of each sensor 21, 22, 23, 24 or 25 corresponding to the movable object. The movable object is a heat source or an IR (infrared radiation) source.

Referring to FIG. 2, a method of the positioning system as above description comprises a directional searching step S1 and a positional searching step S2. In regards to the directional searching step S1, the directional arithmetic unit 11 calculates an angle between the movable object and each sensor 21, 22, 23, 24 or 25 via a distance parameter between each two adjacent sensors 21, 22, 23, 24 and 25 closest to the movable object, and a speed parameter of the movable object. In regards to the positional searching step S2, the positional arithmetic unit 12 measures a position of the movable object relative to at least three sensors 21, 22, 23, 24 and 25 closest to the movable object, via an output ADC (Analog/Digital Converter) voltage outputted from three adjacent sensors 21, 22, 23, 24 and 25 which is transmitted to the positional arithmetic unit 12. Under this arrangement, the positioning device 1 accurately measures a current position of the movable object in an enclosed space 10 via said steps; wherein, the movable object is a heat source or an IR (infrared radiation) source.

The present invention can cooperate with an electric device. For example, the present invention controls the electric device according to a position and an identity of a person in a house, so as to fit an operation of the electric device for the person. In addition, the present invention can accurately measure a current position and a moving direction of the person for monitoring purpose.

Referring to FIGS. 3-4, FIG. 3 shows the enclosed space 10, the sensors 21, 22, 23, 24 and 25 and a sensed area 3. FIG. 4 shows the sensed area 3 with a two-dimensional manner. The sensors 21, 22, 23, 24 and 25 are assembled at a ceiling and are spaced from each other.

Figure 5:
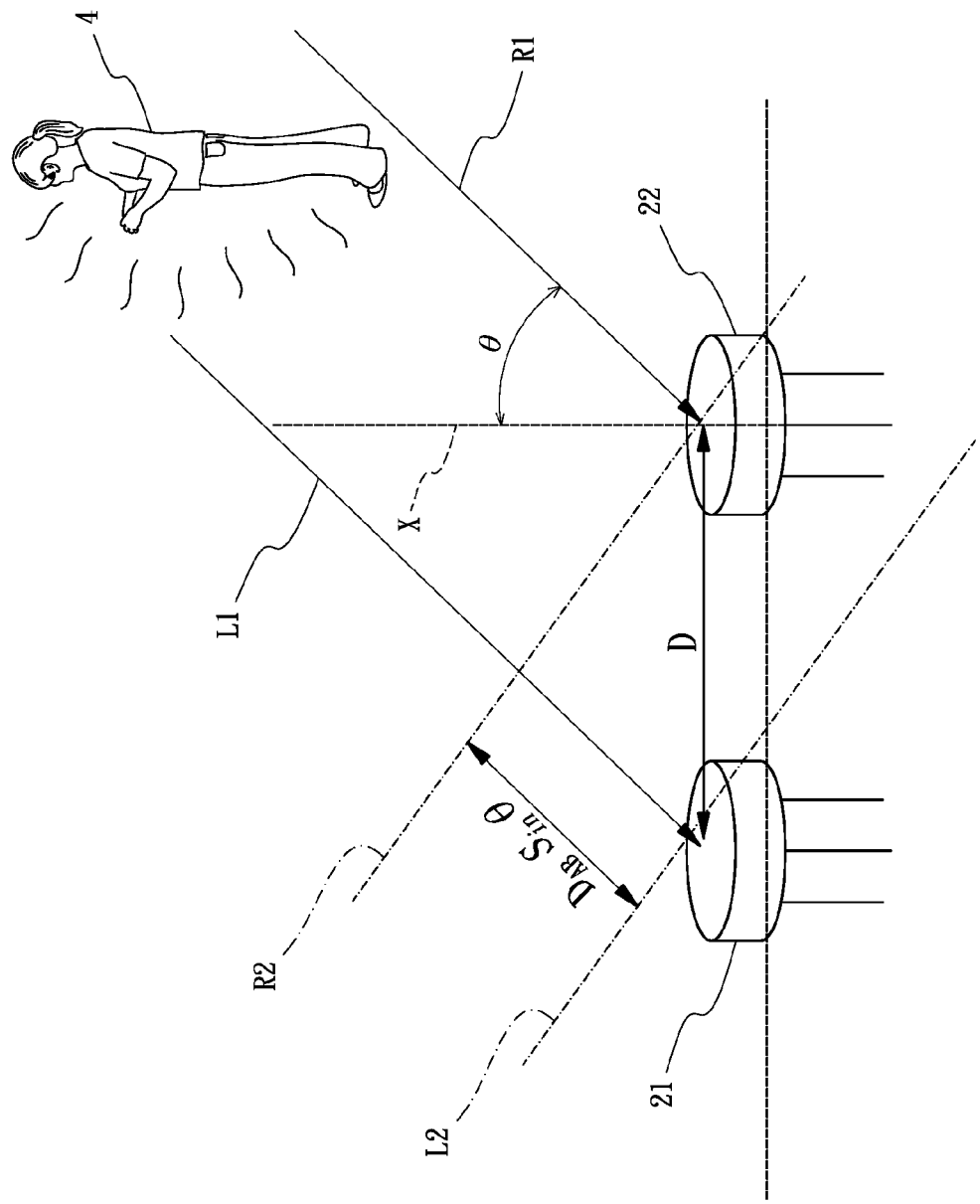
FIG. 5 is a diagram for showing a directional searching step.

Clearly, the directional arithmetic unit 11 measures a moving direction of a sensed object 4. The sensed object 4 is a heat source or a person. Referring to FIG. 5, there are two sensors 21 and 22. One sensor 21 is located at a left side of the enclosed space 10 and is a PIR_A. Another sensor 22 is located at a right side of the enclosed space 10 and is a PIR_B. The sensed object 4 is located at a top right side relative to the sensors 21 and 22. Another sensor 22 is located at right side relative to one sensor 21. Another sensor 22 defines a central axis X. The central axis X passes through another sensor 22. A first right thermo wave R1 is defined from the sensed object 4 to another sensor 22. The first right thermo wave R1 meets the central axis X at a top end of another sensor 22. Another sensor 22 defines a second right thermo wave R2. The first right thermo wave R1 is symmetrical to the second right thermo wave R2 relative to the central axis X. An angle θ is defined by the first right thermo wave R1 and the central axis X. A first left thermo wave L1 is defined from the sensed object 4 to one sensor 21. One sensor 21 defines a second left thermo wave L2. The first left thermo wave L1 is symmetrical to the second left thermo wave L2. A distance D ($D_{AB}$) is defined between the sensors 21 and 22. A distance between the second left thermo wave L2 and the second right thermo wave R2 is defined as $D_{AB} \sin\theta$. A relationship between the distance D ($D_{AB}$) and a sample rate is defined as following:

$$\frac{D_{AB}\sin\theta}{v} > \frac{1}{\text{Sample Rate}}$$

Wherein, the sensors 21 and 22 search the sensed object 4 at a speed. Said speed is defined as v; the sample rate is constant. The sensors 21 and 22 define a delay time (Delay). The angle θ can be calculated to measure the moving direction of the sensed object 4; the function is shown as following:

$$\theta = \sin^{-1}\left(\frac{\text{Delay}*v}{D_{AB}}\right)$$

Figure 6:
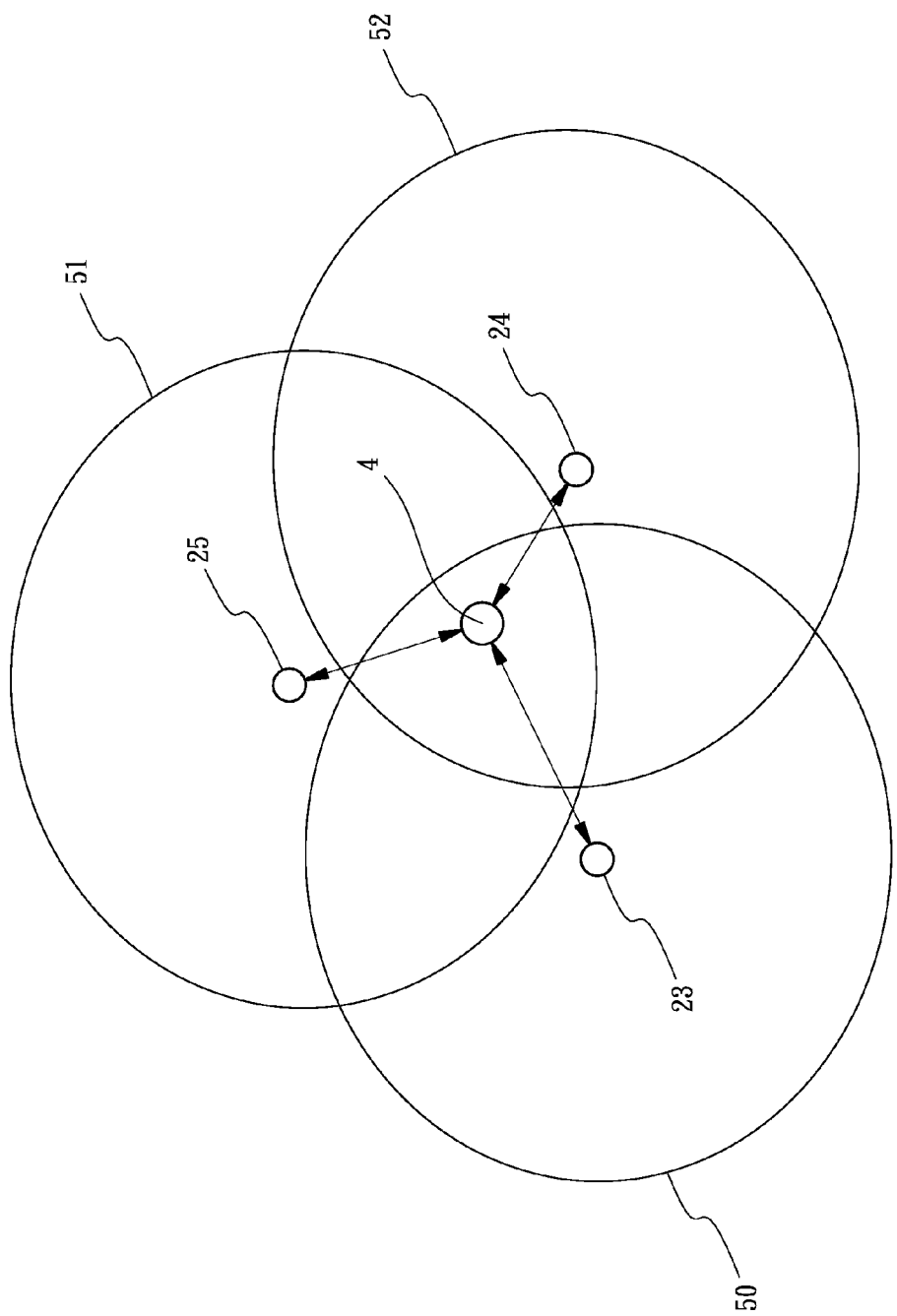
FIG. 6 is a diagram for showing a positional searching step.

Referring to FIG. 6, the sensors 21, 22, 23, 24 and 25 correspond to a wave (about 10 mm) from a heat source of a human body, so that the output ADC voltage from each sensor 21, 22, 23, 24 or 25 depends on a distance between the person and each sensor 21, 22, 23, 24 or 25. When the output ADC voltage from each sensor 21, 22, 23, 24 or 25 is defined as a distance parameter, the positioning device 1 searches a position of the person via three sensors 23, 24 and 25. Clearly, the three sensors 23, 24 and 25 enclose the sensed object 4. The three sensors 23, 24 and 25 respectively define a first sensing region 50, a second sensing region 51 and a third sensing region 52. The coordinate positions of the three sensors 23, 24 and 25 are respectively ($X_A$, $Y_A$), ($X_B$, $Y_B$) and ($X_C$, $Y_C$). The coordinate position of the sensed object 4 is ($X_O$, $Y_O$). A distance between the sensor 23 and the sensed object 4 is $D_{AO}$. A distance between the sensor 24 and the sensed object 4 is $D_{BO}$. A distance between the sensor 25 and the sensed object 4 is $D_{CO}$. The function for the position of the sensed object 4 is defined as following:

$$D_{AO} = \sqrt{(x_A - x_O)^2 + (y_A - y_O)^2}$$

$$D_{BO} = \sqrt{(x_B - x_O)^2 + (y_B - y_O)^2}$$

$$D_{CO} = \sqrt{(x_C - x_O)^2 + (y_C - y_O)^2}$$

The follows shows how the function is figured out.

$$D_{AO} = \sqrt{(x_A - x_O)^2 + (y_A - y_O)^2}$$

$$D_{BO} = \sqrt{(x_B - x_O)^2 + (y_B - y_O)^2}$$

$$D_{CO} = \sqrt{(x_C - x_O)^2 + (y_C - y_O)^2}$$

$$\downarrow$$

$$D_{AO} - D_{BO} = \sqrt{(x_A - x_O)^2 + (y_A - y_O)^2} - \sqrt{(x_B - x_O)^2 + (y_B - y_O)^2}$$

$$D_{AO} - D_{CO} = \sqrt{(x_A - x_O)^2 + (y_A - y_O)^2} - \sqrt{(x_C - x_O)^2 + (y_C - y_O)^2}$$

$$\downarrow$$

$$D_{AO}^2 - D_{BO}^2 = -2x_A x_O - 2y_A y_O - x_B^2 - y_B^2 + 2x_B x_O + 2y_B y_O + x_A^2 + y_B^2$$

$$D_{AO}^2 - D_{CO}^2 = -2x_A x_O - 2y_A y_O - x_C^2 - y_C^2 + 2x_C x_O + 2y_C y_O + x_A^2 + y_C^2$$

$$\downarrow$$

$$\begin{bmatrix} D_{AO}^2 - D_{BO}^2 + (x_B^2 + y_B^2 - x_A^2 - y_A^2) \\ D_{AO}^2 - D_{CO}^2 + (x_C^2 + y_C^2 - x_A^2 - y_A^2) \end{bmatrix} = \begin{bmatrix} 2(x_B - x_A) & 2(y_B - y_A) \\ 2(x_C - x_A) & 2(y_C - y_A) \end{bmatrix} \begin{bmatrix} x_O \\ y_O \end{bmatrix}$$

$$\downarrow$$

$$\begin{bmatrix} D_{1O}^2 - D_{2O}^2 + (x_2^2 + y_2^2 - x_1^2 - y_1^2) \\ \vdots \\ D_{1O}^2 - D_{NO}^2 + (x_N^2 + y_N^2 - x_1^2 - y_1^2) \end{bmatrix} = \begin{bmatrix} 2(x_2 - x_1) & 2(y_2 - y_1) \\ \vdots & \vdots \\ 2(x_N - x_1) & 2(y_N - y_1) \end{bmatrix} \begin{bmatrix} x_O \\ y_O \end{bmatrix}$$

$$\downarrow$$

$$\overline{A} = \begin{bmatrix} 2(x_2 - x_1) & 2(y_2 - y_1) \\ \vdots & \vdots \\ 2(x_N - x_1) & 2(y_N - y_1) \end{bmatrix}$$

$$\downarrow$$

$$\overline{B} = \begin{bmatrix} D_{1O}^2 - D_{2O}^2 + (x_2^2 + y_2^2 - x_1^2 - y_1^2) \\ \vdots \\ D_{1O}^2 - D_{NO}^2 + (x_N^2 + y_N^2 - x_1^2 - y_1^2) \end{bmatrix}$$

$$\begin{bmatrix} x_O \\ y_O \end{bmatrix} = (\overline{A}^T \overline{A})^{-1} * (\overline{A}^T \overline{B})$$

Although the invention has been explained in relation to its preferred embodiment, it is to be understood that many other possible modifications and variations can be made without departing from the spirit and scope of the invention as hereinafter claimed.

What is claimed is:

1. A positioning system adapted to be assembled in an enclosed space so as to control an electric device while a current position of a movable object is in an enclosed space, comprising a positioning device and at least three sensors assembled and fixed at a ceiling, characterized by:

the positioning device has a directional arithmetic unit and a positional arithmetic unit, each sensor is electrically connected to the directional arithmetic unit and the positional arithmetic unit of the positioning device, the directional arithmetic unit calculates an angle between the movable object and each sensor closest thereto via a distance parameter between each two adjacent sensors closest to the movable object and a speed parameter of the movable object, and the positional arithmetic unit measures a position of the movable object relative to at least three sensors closest to the movable object, via an output ADC voltage from three adjacent sensors closest to the movable object;

wherein, the directional arithmetic unit and the positional arithmetic unit of the positioning device measures the current position of the movable object in the enclosed space, via a time difference, based on the angle, the distance parameter, and the speed parameter, between the sensors closest to the movable object while the movable object passes therethrough in series, and an output value of a voltage of each sensor corresponding to the movable object.

2. A method of the positioning system as claimed in claim 1 for controlling an electric device while a current position of a movable object is in an enclosed space, comprising:

a directional searching step: calculating the angle between the movable object and each sensor closest thereto with the directional arithmetic unit of the processor via the distance parameter between each two adjacent sensors closest to the movable object and the speed parameter of the movable object; and a positional searching step: transmitting the output ADC voltage outputted from the at least three adjacent sensors electrically connected with the positioning device closest to the movable object to the positional arithmetic unit of the positioning device and then measuring the position of the movable object relative to the at least three sensors closest to the movable object with the positional arithmetic unit;

wherein the current position of the movable object is measured by said steps via the angle, the distance parameter, the speed parameter, and the output ADC voltage.

3. The method as claimed in claim 2, wherein the movable object is a heat source or an IR (infrared radiation) source.

* * * * *